United States Patent
Wang et al.

(10) Patent No.: US 8,966,091 B2
(45) Date of Patent: Feb. 24, 2015

(54) METHOD OF DISTINGUISHING A PLURALITY OF UES SHARING ONE PUID AND A DEVICE THEREOF

(75) Inventors: Zhi Wang, Shanghai (CN); Qingbo Zhang, Shanghai (CN)

(73) Assignee: Alcatel Lucent, Boulogne-Billancourt (FR)

( * ) Notice: Subject to any disclaimer, the term of this patent is extended or adjusted under 35 U.S.C. 154(b) by 10 days.

(21) Appl. No.: 12/998,644

(22) PCT Filed: Dec. 23, 2009

(86) PCT No.: PCT/CN2009/075892
§ 371 (c)(1),
(2), (4) Date: May 12, 2011

(87) PCT Pub. No.: WO2010/091588
PCT Pub. Date: Aug. 19, 2010

(65) Prior Publication Data
US 2011/0289223 A1    Nov. 24, 2011

(30) Foreign Application Priority Data
Feb. 11, 2009 (CN) .......................... 2009 1 0004210

(51) Int. Cl.
*G06F 15/16* (2006.01)
*H04L 29/12* (2006.01)

(52) U.S. Cl.
CPC ...... *H04L 29/12801* (2013.01); *H04L 61/3095* (2013.01); *H04L 61/6004* (2013.01)
USPC ........... 709/227; 709/228; 709/220; 709/221; 709/222

(58) Field of Classification Search
CPC ..................... H04L 29/12801; H04L 61/6004; H04L 61/3095
See application file for complete search history.

(56) References Cited

U.S. PATENT DOCUMENTS

| 8,254,288 | B2 * | 8/2012 | Lindgren et al. ............... 370/254 |
| 2005/0153686 | A1 * | 7/2005 | Kall et al. .................. 455/412.1 |
| 2006/0218291 | A1 * | 9/2006 | Zhu et al. ....................... 709/229 |
| 2010/0189248 | A1 * | 7/2010 | Ding et al. ............... 379/211.02 |
| 2011/0075658 | A1 * | 3/2011 | Belinchon Vergara et al. ............................. 370/352 |

FOREIGN PATENT DOCUMENTS

| CN | 101330741 | 12/2008 | |
| WO | WO 2009/010017 A1 * | 1/2009 | .............. H04M 3/42 |

* cited by examiner

*Primary Examiner* — Wing F Chan
*Assistant Examiner* — Padma Mundur
(74) *Attorney, Agent, or Firm* — Carmen Patti Law Group, LLC (57) ABSTRACT

The present invention provides with a method of distinguishing a plurality of calling UEs sharing a PUID in a calling S-CSCF of IMS network and the device thereof. When a calling UE using a shared PUID in the calling-party network requests to establish a session with some called UE in the called-party network, the calling S-CSCF adds a extension identification corresponding to the calling UE into the session request message from the calling UE and sends the session request message with the extension identification added therein to the called UE in the called-party network, such that the called UE may realize which one is the actual calling UE according to the extension identification in the session request message and the shared PUID used by the calling UE. Therefore, after completion of such session, the called UE may re-establish a session with the calling UE according to the extension identification of the calling UE and the shared PUID thereof.

13 Claims, 4 Drawing Sheets

METHOD OF DISTINGUISHING A PLURALITY OF UES SHARING ONE PUID AND A DEVICE THEREOF

TECHNICAL FIELD

The present invention relates to IMS network, particularly to a calling Serving Call Session Control Function (calling S-CSCF) and a called Serving Call Session Control Function (called S-CSCF) in IMS network.

BACKGROUND

IP Multimedia Subsystem (IMS) is a subsystem proposed by 3rd Generation Partnership Project (3GPP), which is capable of supporting IP Multimedia service. The significant features of IMS are that Session Initiation Protocol (SIP) is adopted, and communication thereof has nothing to do with access mode, multiple media services can be provided, and there is a layered-manner design between controlling function and bearing function, call and session, application and service, service and network, and there is a mergence between mobile network and Internet service. IMS is in conformity to the trend of mergence development of telecommunication network.

In IMS R6, a shared public user identity (PUID) is introduced to allow one PUID to be shared by a plurality of user equipments (UE), wherein, the PUID shared by the plurality of UEs is referred to as shared PUID. The utilization of the shared PUID is fairly beneficial to the cooperative work modes, e.g. service hotline, emergency call 110, etc. Meanwhile, it can also be shared among different UEs of the same user, e.g. home fixed phone, office fixed phone and mobile phone, etc.

However, the use of the shared PUID also brings some problems that the called party cannot get to know which UE is the real calling party if the call is initiated by a calling party with a shared PUID, because the shared PUID is being used by multiple users. For instance, consider the scenario that user A received a call from user B with a shared PUID adopted for some issues. After the call is terminated, the user A may not call back to the user B for more detailed discussion because he doesn't know from which UE the call is made.

Moreover; in the case that a plurality of UEs share a PUID, the plurality of UEs cannot communicate with each other directly.

Although the contact address can be used to identify a plurality of UEs which share a PUID, it is not bound to a UE permanently and may be changed in the next registration.

In the prior art, for addressing the above problems, there is proposed a mechanism of SIP Globally Routable User Agent URIs, but still with the following drawbacks for GRUU:

Since it's a combination with UE, GRUU is bonded to the UE instead of the user; therefore, once the user switches to register on another UE, the other users could not find him from the GRUU he saved previously.

Additionally, the use of GRUU depends on how much a UE supports SIP. In IMS network, as SIP is not supported by those legacy UEs, GRUU mechanism can not be used.

SUMMARY OF THE INVENTION

To address the above deficiencies of the prior art, there is provided a method and device of distinguishing a plurality of calling UEs sharing a PUID in a calling S-CSCF of IMS network, and correspondingly a method and device of forwarding a session request message from a calling UE to a called UE among a plurality of called UEs sharing a PUID in a called S-CSCF of IMS network.

According to a first aspect of the present invention, there is provided a method of distinguishing a plurality of calling UEs sharing a PUID in a calling S-CSCF of IMS network. The method comprises the steps of: a. receiving a session request message from a calling UE for requesting to establish a session; c. adding an extension identification corresponding to said calling UE into said session request message, wherein said extension identification is used for distinguishing said plurality of calling UEs; d. sending a session request message updated by said step c to a called UE.

Preferably, after the step a and prior to the step c, the above method further comprises the steps of: b1. extracting the PUID of said calling UE from said session request message; b2. judging whether said PUID is a shared PUID; wherein said step c further comprises: adding said extension identification corresponding to said calling UE into said session request message, if said PUID is a shared PUID.

Preferably, after the step b2 and prior to the step c, the above method further comprises the step of: judging whether said extension identification feature of said calling UE is enabled; wherein said step c further comprises: adding said extension identification corresponding to said calling UE into said session request message, if said extension identification feature is enabled.

According to a second aspect of the present invention, there is provided a method of forwarding a session request message from a calling UE to a called UE among a plurality of called UEs sharing a PUID in a called S-CSCF of IMS network. The method comprises the following steps: i. receiving a session request message from said calling UE for requesting to establish a session; ii. judging whether said called UE uses a shared PUID, according to said session request message; iii. judging whether said session request message includes an extension identification corresponding to said called UE, if said called UE uses a shared PUID, wherein said extension identification is used for distinguishing said plurality of called UEs; iv. sending said session request message to said called UE according to said extension identification and the shared PUID of said called UE, if said session request message comprises said extension identification.

Preferably, after the step iii, the above method further comprises the steps of: v. sending an inquiry message to said calling UE, if said session request message does not include said extension identification, wherein said inquiry message is used for inquiring said calling UE whether there is a provision of an extension identification corresponding to said called UE; vi. sending said session request message to said called UE, according to said extension identification corresponding to said called UE provided by said calling UE and said shared PUID of said called UE.

Preferably, after the step iii and prior to the step iv, the above method further comprises the step of: judging whether the extension identification feature of said called UE is enabled, if said session request message includes said extension identification; wherein said step iv further comprises: sending said session request message to said called UE according to said extension identification and said shared PUID of said called UE, if said extension identification feature is enabled.

According to a third aspect of the present invention, there is provided a first control device for distinguishing a plurality of calling UEs sharing a PUID in a calling S-CSCF of IMS network. The first control device comprises: a first receiving means, for receiving a session request message from a calling UE for requesting to establish a session; an adding means, for adding an extension identification corresponding to said calling UE into said session request message, wherein said extension identification is used for distinguishing said plurality of calling UEs; a first sending means, for sending a session request message updated by said adding means to a called UE.

Preferably, the first control device further comprises: a first extracting means, for extracting the PUID of said calling UE from said session request message; a first judging means, for judging whether said PUID is a shared PUID; wherein said adding means is further used for adding said extension identification corresponding to said calling UE into said session request message, if said PUID is a shared PUID.

Preferably, the first control device further comprises: a second judging means, for judging whether said extension identification feature of said calling UE is enabled; wherein said adding means is further used for adding said extension identification corresponding to said calling UE into said session request message, if said extension identification feature is enabled.

According to a fourth aspect of the present invention, there is provided a second control device for forwarding a session request message from a calling UE to a called UE among a plurality of called UEs sharing a PUID in a called S-CSCF of IMS network. The second control device comprises: a second receiving means, for receiving a session request message from said calling UE for requesting to establish a session; a third judging means, for judging whether said called UE uses a shared PUID, according to said session request message; a fourth judging means, for judging whether said session request message includes an extension identification corresponding to said called UE, if said called UE uses shared PUID, wherein said extension identification is used for distinguishing said plurality of called UEs; a second sending means, for sending said session request message to said called UE according to said extension identification and the shared PUID of said called UE, if said session request message comprises said extension identification.

Preferably, the second control device further comprises: a third sending means, for sending an inquiry message to said calling UE if said session request message does not include said extension identification, wherein said inquiry message is used for inquiring said calling UE whether there is a provision of an extension identification corresponding to said called UE; a fourth sending means, for sending said session request message to said called UE, according to said extension identification corresponding to said called UE provided by said calling UE and said shared PUID of said called UE.

Preferably, the second control device further comprises: a fifth judging means, for judging whether the extension identification feature of said called UE is enabled, if said session request message includes said extension identification; wherein said second sending means is further used for sending said session request message to said called UE according to said extension identification and said shared PUID of said called UE, if said extension identification feature is enabled.

By means of the method and device of the present invention, a plurality of calling UEs sharing a PUID in IMS network can be distinguished. Specifically, when a calling UE using a shared PUID in the calling-party network requests to establish a session with certain called UE in the called-party network, the calling S-CSCF of the calling-party network adds an extension identification corresponding to the calling UE into the session request message received from the calling UE, and sends the session request message with the extension identification added to a called UE in the called-party network, such that the called UE may identify the calling UE according to the extension identification in the session request message and the shared PUID used by the calling UE. Therefore, after completion of this session, the called UE may re-establish a session with the calling UE according to the extension identification of the calling UE and the shared PUID used therein.

Even for a plurality of UEs which share one PUID, they may also directly establish a session thereamong by adding the extension identification into the session request message.

BRIEF DESCRIPTION OF THE DRAWINGS

Features, aspects and advantages of the present invention will become more obvious by reading the following description of non-limiting embodiments with the aid of appended drawings.

wherein, same or similar reference numerals refer to the same or similar device (module) or step of method.

DETAILED DESCRIPTION OF EMBODIMENTS

Detailed description will be made to the present invention with reference to the accompanying figures.

To carry out the solution of the present invention, first, service provider or operator defines, in the public identification class, a new attribute of extension identification (extension ID), wherein the extension identification may be an address of any data type. Preferably, the extension identification includes at least one nonnegative integer, for example the extension identification is composed of any one or more number from 0 to 9. It may be acceptable as long as the extension identification corresponding to each UE of a plurality of UEs sharing the same PUID is unique.

Before a UE accesses the IMS network, it needs to send a registration request message to S-CSCF to request for a registration authorization. After S-CSCF receives the registration request message, according to the Private User Identity corresponding to the UE in the registration request message, authorization is made for the UE by the security data authorization center (AuC) of Home Subscriber Server (HSS). Meanwhile, S-CSCF downloads the user profile of the UE from HSS, and with the user profile, S-CSCF may acquire the extension identification corresponding to the UE.

It should be noted that, the registration authorization procedure before UE accesses the IMS network has been used in prior art and no redundant description will be made herein for simplicity.

In registration authorization procedure, both the shared PUID and extension identification of the UE are bound to an IP address. In the subsequent session procedure, those session request messages sent to the shared PUID and extension identification will all be forwarded to the UE to which the IP address corresponds. Since extension identifications corresponding to a plurality of UEs sharing the same PUID are different, for the plurality of UEs sharing the same PUID, the shared PUID and extension identification together can uniquely identify one UE of the plurality of UEs, thereby achieve the purpose of distinguishing a plurality of UEs sharing the same PUID.

Detailed description will be made to the solution of the present invention with reference to FIG. 1.

Figure 1:
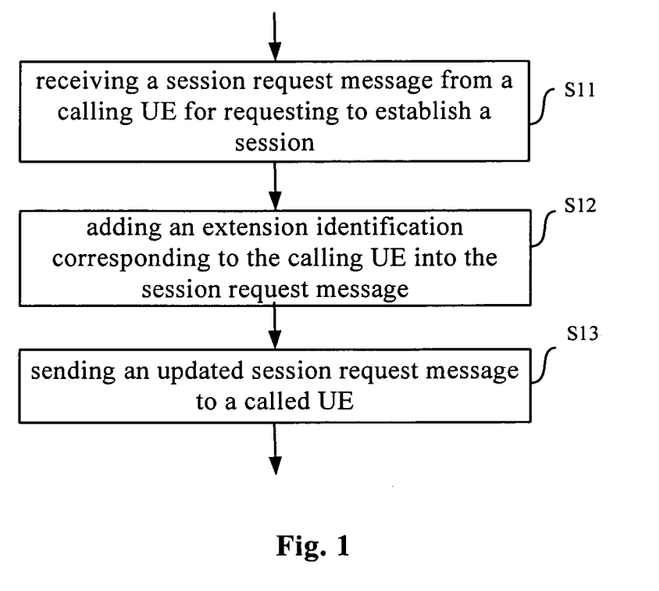
FIG. 1 illustrates a flowchart of a method of distinguishing a plurality of calling UEs sharing a PUID in a calling S-CSCF of IMS network according to an embodiment of the present invention.

FIG. 1 illustrates a flowchart of a method of distinguishing a plurality of calling UEs sharing a PUID in a calling S-CSCF of IMS network according to an embodiment of the present invention.

In the IMS network of FIG. 1, for simplicity, the UE, S-CSCF, P-CSCF and I-CSCF in calling party network are respectively referred to as calling UE, calling S-CSCF, calling P-CSCF and calling I-CSCF, the UE in called party network is referred to as called UE.

First, in step S11, calling S-CSCF receiving a session request message (INVITE) from a calling UE for requesting to establish a session.

Specifically, the session request message received by calling S-CSCF from the calling UE for requesting to establish a session is forwarded to calling S-CSCF via routing of calling P-CSCF and calling I-CSCF.

Wherein, the session request message includes the PUID of the calling UE and the PUID of the called UE with which the calling UE is about to establish a session. Certainly, the session request message may further comprise other information which belongs to prior art, and no redundant description will be made herein for simplicity.

Second, in step S12, the calling S-CSCF adding the acquired extension identification corresponding to the calling UE into the session request message.

Wherein, the extension identification is used for distinguishing a plurality of calling UEs which use a shared PUID.

Furthermore, the extension identification corresponding to the UE added by the calling S-CSCF into the session request message is acquired from the user profile corresponding to the UE after the calling S-CSCF download the user profile from the HSS when the UE applies a registration thereto.

Preferably, after the calling S-CSCF receives the session request message from the calling UE, first, it will judge whether the calling UE uses a shared PUID, according to the session request message.

Specifically, the calling S-CSCF, first, extracts the PUID of the calling UE from the received session request message; then, judges whether the PUID is a shared PUID. Since all the shared PUID(s) are registered in the IMS network, the calling S-CSCF may get a judgment about whether the PUID is a shared PUID according to the PUID corresponding to the calling UE in the session request message.

If the PUID of the calling UE is a shared PUID, then, the calling S-CSCF adds the acquired extension identification corresponding to the calling UE into the session request message.

More preferably, when the calling S-CSCF gets a judgment that the calling UE uses a shared PUID, it will further judge whether the extension identification feature of the calling UE is enabled.

If the extension identification feature of the calling UE is enabled, the calling S-CSCF adds the acquired extension identification corresponding to the calling UE into the session request message.

Certainly, if the extension identification feature of the calling UE is not enabled, then, even if the calling UE uses a shared PUID, the calling S-CSCF will not add the extension identification corresponding to the calling UE into the session request message.

Preferably, the extension identification corresponding to the calling UE may be served as part of the shared PUID of the calling UE to be added into the shared PUID in the session request message. Thus, the called UE may receive the shared PUID corresponding to the calling UE with the extension identification included, without need of any modification, such that the called UE may establish a session with the calling UE by the shared PUID including the extension identification when the called UE needs to initiates a session request for the calling UE.

Certainly, the extension identification corresponding to the calling UE may be added into the session request message as an independent parameter regardless of shared PUID. Thus, the called UE should be modified to enable the receiving of the extension identification.

Subsequently, in step S13, the calling S-CSCF sends the session request message with the extension identification added to the called UE.

Then, the called UE responses the session request by 200 OK. After the calling UE receives the response of 200 OK from the called UE, it sends a ACK to the called UE so as to notify the called UE that it has received the final response for this session request message, which, those skilled in the art can appreciate that, belongs to prior art without need of redundant description.

Thus, the session has been established between the calling UE and called UE.

It should be noted that, since the calling S-CSCF adds the extension identification corresponding to the calling UE into the session request message received from the calling UE, when the called UE receives the session request message, it may identify, by the extension identification therein, which one the calling UE is among the plurality of UEs sharing the same PUID. Therefore, after completion of such a session, if the called UE is willing to re-establish a session connection with the calling UE by which the last call is initiated, the called UE may establish a session with the calling UE according to the extension identification of the calling UE and the shared PUID used therein.

FIG. 1 depicts an embodiment of the present invention from the aspect that the calling UE uses a shared PUID, description will be made to another embodiment of the present invention from the aspect that the called UE uses the shared PUID with FIG. 2 as reference.

Figure 2:
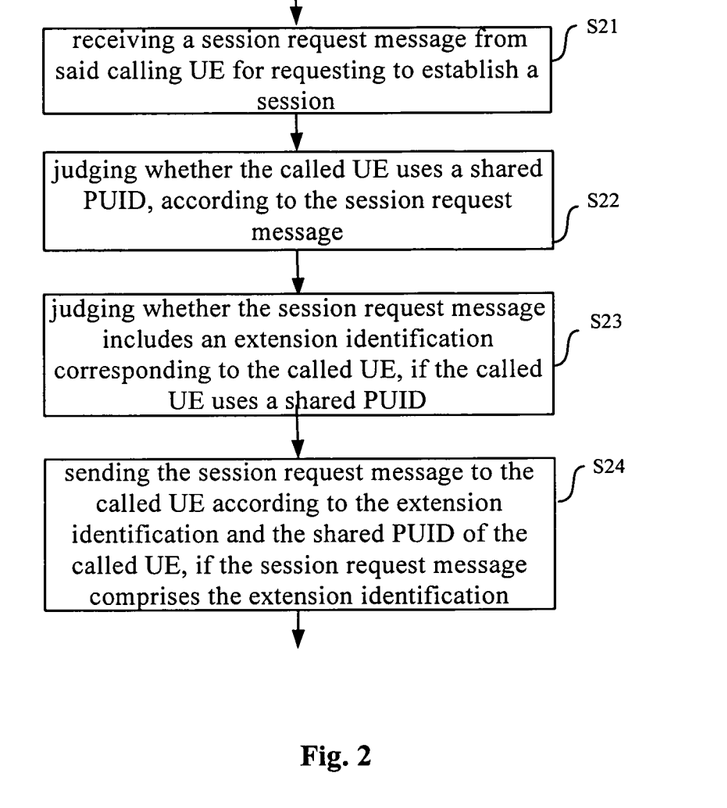
FIG. 2 illustrates a flowchart of a method of forwarding a session request message from a calling UE to a called UE among a plurality of called UEs sharing a PUID in a called S-CSCF of IMS network according to an embodiment of the present invention.

FIG. 2 illustrates a flowchart of a method of forwarding a session request message from a calling UE to a called UE among a plurality of called UEs sharing a PUID in a called S-CSCF of IMS network according to an embodiment of the present invention;

In the IMS network of FIG. 2, for simplicity, the UE, S-CSCF, P-CSCF and I-CSCF in calling party network are respectively referred to as calling UE, calling S-CSCF, calling P-CSCF and calling I-CSCF, the UE and S-CSCF in called party network are referred to as called UE and called S-CSCF.

The calling UE, first, sends a session request message for requesting to establish a session with the called UE.

Wherein the session request message is forwarded to the called S-CSCF in the called-party network by routing of the calling P-CSCF, calling I-CSCF and calling S-CSCF in the calling-party network.

In step S21, the called S-CSCF receives the session request message from the calling UE for the request of establishment of a session, and the session request message is forwarded via the routing of the calling P-CSCF, the calling I-CSCF and the calling S-CSCF.

Wherein, the session request message includes the PUID of the calling UE and the PUID of the called UE. Certainly, the session request message may further include other information, which belongs to the prior art thus without need of redundant description herein for simplicity.

Then, in step S22, the called S-CSCF judges whether the called UE uses a shared PUID, according to the received session request message.

Specifically, the called S-CSCF extracts the PUID of the called UE from the received session request message, and then, judges whether the PUID is a shared PUID. Since all shared PUID(s) are registered in the IMS network, the called S-CSCF can reach a judgment about whether it is a shared PUID according to the PUID corresponding to the called UE in the session request message.

If the PUID is a shared PUID, then, in step S23, the called S-CSCF judges whether the session request message includes the extension identification corresponding to the called UE. Wherein the extension identification is used for distinguishing a plurality of called UEs which use the same shared PUID.

If the session request message includes the extension identification corresponding to the called UE, then in step S24, the called S-CSCF sends the session request message to the called UE according to the extension identification and the shared PUID of the called UE.

Furthermore, when the called UE is about to access the IMS network so as to apply a registration on the called S-CSCF, the called S-CSCF downloads the user profile corresponding to the called UE from HSS, and acquires the extension identification corresponding to the UE from the user profile. Subsequently, the extension identification and the shared PUID of the called UE are both bound to an IP address. Thus, in step S24, the called S-CSCF sends the session request message to the called UE corresponding to the bound IP address according to the extension identification and the shared PUID of the called UE.

If the session request message does not contain the extension identification corresponding to the called UE, then, the called S-CSCF may further forward the session request message according to those transmitting mechanism already in the prior art.

Preferably, if the session request message does not contain the extension identification corresponding to the called UE, then, the called S-CSCF may send an inquiry message to the calling UE, wherein the inquiry message is used for enquiring the calling UE about whether there is a provision of an extension identification corresponding to the called UE.

If the calling UE has the extension identification corresponding to the called UE and provides the called S-CSCF with the extension identification, then, the called S-CSCF may send the session request message to the called UE according to the extension identification and the shared PUID of the called UE.

Preferably, if the session request message contains the extension identification corresponding to the called UE, then the called S-CSCF may further judges whether the extension identification feature of the called UE is enabled.

If the extension identification feature of the called UE is enabled, then the called S-CSCF sends the session request message to the called UE according to the extension identification and the shared PUID of the called UE.

Certainly, if the extension identification feature of the called UE is not enabled, then, even if the session request message contains the extension identification corresponding to the called UE, the called S-CSCF will take no corresponding action but further forward the session request message according to those transmitting mechanism already in the prior art.

After the corresponding called UE receives the session request message from the calling UE, it may send a 200 OK message as a response for the session request. After the calling UE receives the 200 OK response, it will send a ACK to the called UE so as to notify the called UE that it has received the final response message for this session request message, which, those skilled in the art can appreciate that, belongs to prior art without need of redundant description herein.

Based thereon, the calling UE establishes a session connection with the called UE.

Hereinabove, description of the solution of the present invention is depicted from a method perspective, and hereinafter, a description will be made to the solution of the present invention from a device perspective in combination with FIG. 3 and FIG. 4.

Figure 3:
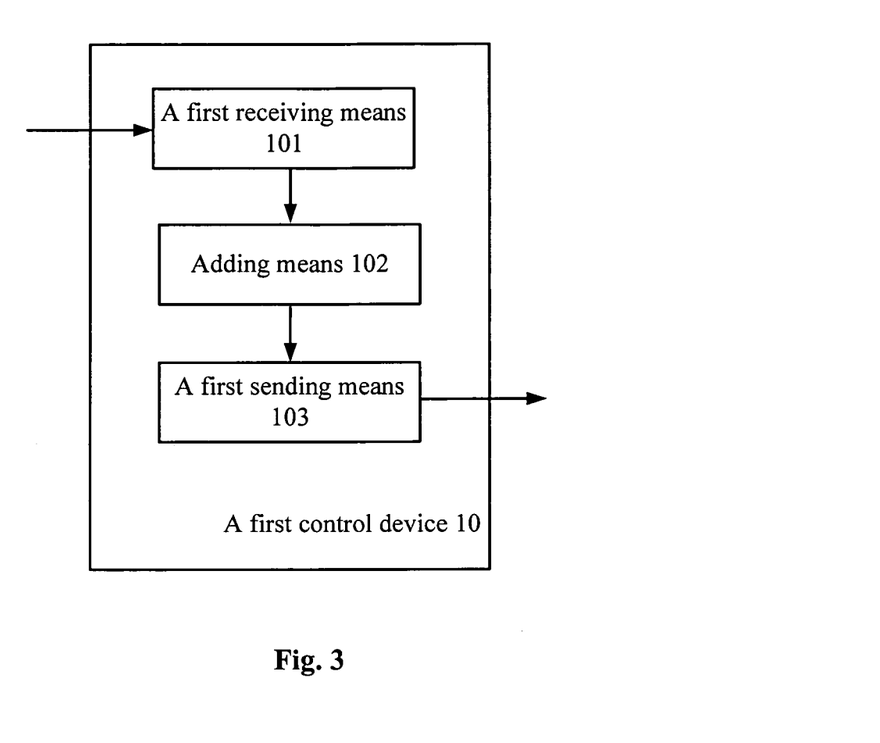
FIG. 3 illustrates a function block diagram of a first control device for distinguishing a plurality of calling UEs sharing a PUID in a calling S-CSCF of IMS network according to an embodiment of the present invention.

FIG. 3 illustrates a function block diagram of a first control device of distinguishing a plurality of calling UEs sharing a PUID in a calling S-CSCF of IMS network according to an embodiment of the present invention;

In the IMS network involved in FIG. 3, for simplicity, the UE, S-CSCF, P-CSCF and I-CSCF in calling party network are respectively referred to as calling UE, calling S-CSCF, calling P-CSCF and calling I-CSCF, the UE in called party network is referred to as called UE.

First, the first receiving means 101, within the first control device 10 in calling S-CSCF, receives a session request message (INVITE) from a calling UE for requesting to establish a session.

Specifically, the session request message received by the first receiving means 101 from the calling UE for requesting to establish a session is forwarded to calling S-CSCF via routing of calling P-CSCF and calling I-CSCF.

Wherein, the session request message includes the PUID of the calling UE and the PUID of the called UE with which the calling UE is about to establish a session. Certainly, the session request message may further comprise other information which belongs to prior art, and no redundant description will be made herein for simplicity.

Second, adding means 102 within the first control device 10 in the calling S-CSCF, adds the acquired extension identification corresponding to the calling UE into the session request message.

Wherein, the extension identification is used for distinguishing a plurality of calling UEs which use a shared PUID.

Furthermore, the extension identification corresponding to the UE added by adding means 102 into the session request message is acquired from the user profile corresponding to the UE after the calling S-CSCF download the user profile from the HSS when the UE applies a registration thereto.

Preferably, after the first receiving means 101 receives the session request message from the calling UE, first, the first extracting means (not shown in the figure for simplicity) within the first control device 10 in the calling S-CSCF extracts the PUID of the calling UE from the received session request message; then, the first judging means (not shown in the figure for simplicity) within the first control device 10 judges whether the PUID is a shared PUID. Since all shared PUID(s) are registered in the IMS network, the calling S-CSCF may get a judgment about whether the PUID is a shared PUID according to the PUID corresponding to the calling UE in the session request message.

If the PUID of the calling UE is a shared PUID, then, the adding means 102 adds the acquired extension identification corresponding to the calling UE into the session request message.

More preferably, when the first judging means 102 gets a judgment that the calling UE uses a shared PUID, the second judging means (not shown in FIG. 3 for simplicity) within the first control device 10 will further judge whether the extension identification feature of the calling UE is enabled.

If the extension identification feature of the calling UE is enabled, adding means 102 adds the acquired extension identification corresponding to the calling UE into the session request message.

Certainly, if the extension identification feature of the calling UE is not enabled, then, even if the calling UE uses a shared PUID, adding means 102 will not add the extension identification corresponding to the calling UE into the session request message.

Preferably, the extension identification corresponding to the calling UE may be served as part of the shared PUID of the calling UE to be added into the shared PUID in the session request message. Thus, the called UE may receive the shared PUID corresponding to the calling UE with the extension identification included, without need of any modification, such that the called UE may establish a session with the calling UE by the shared PUID including the extension identification when the called UE needs to initiates a session request for the calling UE.

Certainly, the extension identification corresponding to the calling UE may be added into the session request message as an independent parameter regardless of shared PUID. Thus, the called UE should be modified to enable the receiving of the extension identification.

Subsequently, the first sending means 103 within the first control device 10 in the calling S-CSCF sends the session request message with the extension identification added to the called UE.

Then, the called UE responses the session request by 200 OK. After the calling UE receives the response of 200 OK from the called UE, it sends a ACK to the called UE so as to notify the called UE that it has received the final response for this session request message, which, those skilled in the art can appreciate that, belongs to prior art without need of redundant description.

Thus, the session has been established between the calling UE and called UE.

It should be noted that, since the calling S-CSCF adds the extension identification corresponding to the calling UE into the session request message received from the calling UE, when the called UE receives the session request message, it may identify, by the extension identification therein, which one the calling UE is among the plurality of UEs sharing the same PUID. Therefore, after completion of such a session, if the called UE is willing to re-establish a session connection with the calling UE by which the last call is initiated, the called UE may establish a session with the calling UE according to the extension identification of the calling UE and the shared PUID used therein.

FIG. 3 depicts an embodiment of the present invention from the aspect that the calling UE uses a shared PUID, description will be made to another embodiment of the present invention from the aspect that the called UE uses the shared PUID with FIG. 4 as reference.

Figure 4:
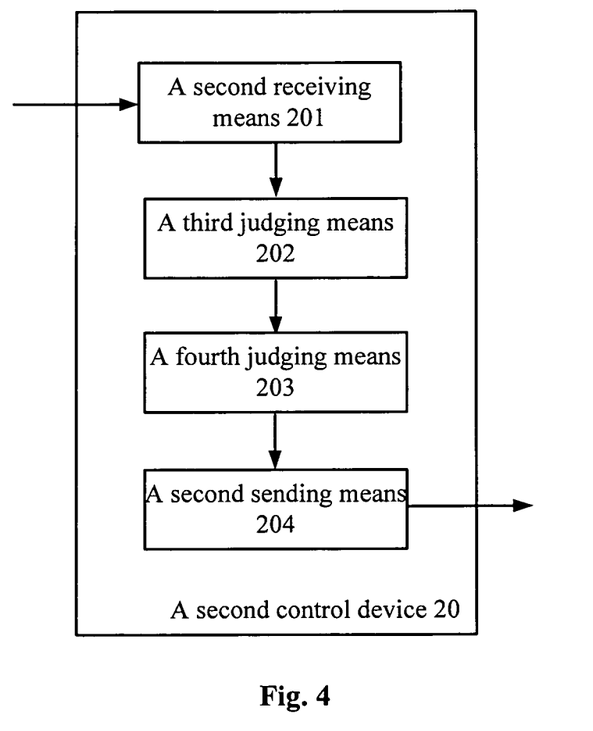
FIG. 4 illustrates a function block diagram of a second control device for forwarding a session request message from a calling UE to a called UE among a plurality of called UEs sharing a PUID in a called S-CSCF of IMS network according to an embodiment of the present invention.

FIG. 4 illustrates a function block diagram a second control device of forwarding a session request message from a calling UE to a called UE among a plurality of called UEs sharing a PUID in a called S-CSCF of IMS network according to an embodiment of the present invention;

In the IMS network of FIG. 4, for simplicity, the UE, S-CSCF, P-CSCF and I-CSCF in calling party network are respectively referred to as calling UE, calling S-CSCF, calling P-CSCF and calling I-CSCF, the UE and S-CSCF in called party network are referred to as called UE and called S-CSCF.

The calling UE, first, sends a session request message for requesting to establish a session with the called UE.

Wherein the session request message is forwarded to the called S-CSCF in the called-party network by routing of the calling P-CSCF, calling I-CSCF and calling S-CSCF in the calling-party network.

The second receiving means 201, within the second control device 20 in the called S-CSCF, receives the session request message from the calling UE for the request of establishment of a session, and the session request message is forwarded via the routing of the calling P-CSCF, the calling I-CSCF and the calling S-CSCF.

Wherein, the session request message includes the PUID of the calling UE and the PUID of the called UE. Certainly, the session request message may further include other information, which belongs to the prior art thus without need of redundant description herein for simplicity.

Then, the third judging means 202, within the second control device 20 in the called S-CSCF, judges whether the called UE uses a shared PUID, according to the received session request message.

Specifically, the second extracting means (not shown in FIG. 4 for simplicity), within the third judging means 202, extracts the PUID of the called UE from the received session request message, and then, the sixth judging means (not shown in FIG. 4 for simplicity) within the third judging means 202 judges whether the PUID is a shared PUID. Since all shared PUID(s) are registered in the IMS network, the called S-CSCF can reach a judgment about whether it is a shared PUID according to the PUID corresponding to the called UE in the session request message.

If the PUID is a shared PUID, then, the fourth judging means 203 within the second control device 20 in the called S-CSCF, judges whether the session request message includes the extension identification corresponding to the called UE. Wherein the extension identification is used for distinguishing a plurality of called UEs which use the same shared PUID.

If the session request message includes the extension identification corresponding to the called UE, then the second sending means 204, within the second control device 20 in the called S-CSCF, sends the session request message to the called UE according to the extension identification and the shared PUID of the called UE.

Furthermore, when the called UE is about to access the IMS network so as to apply a registration on the called S-CSCF, the called S-CSCF downloads the user profile corresponding to the called UE from HSS, and acquires the extension identification corresponding to the UE from the user profile. Subsequently, the extension identification and the shared PUID of the called UE are both bound to an IP address. Thus, the second sending means 204 sends the session request message to the called UE corresponding to the bound IP address according to the extension identification and the shared PUID of the called UE.

If the session request message does not contain the extension identification corresponding to the called UE, then, the second sending means 204 may further forward the session request message according to those transmitting mechanism already in the prior art.

Preferably, if the session request message does not contain the extension identification corresponding to the called UE, then, the third sending means (not shown in FIG. 4 for simplicity), within the second control device 20 in the called S-CSCF, may send an inquiry message to the calling UE, wherein the inquiry message is used for enquiring the calling UE about whether there is a provision of an extension identification corresponding to the called UE.

If the calling UE has the extension identification corresponding to the called UE and provides the called S-CSCF with the extension identification, then, the fourth sending means (not shown in FIG. 4 for simplicity), within the second control device 20 in the called S-CSCF, may send the session request message to the called UE according to the extension identification and the shared PUID of the called UE.

Preferably, if the session request message contains the extension identification corresponding to the called UE, then the fifth judging means (not shown in FIG. 4 for simplicity), within the second control device 20 in the called S-CSCF, may further judges whether the extension identification feature of the called UE is enabled.

If the extension identification feature of the called UE is enabled, then the second sending means 204 sends the session request message to the called UE according to the extension identification and the shared PUID of the called UE.

Certainly, if the extension identification feature of the called UE is not enabled, then, even if the session request message contains the extension identification corresponding to the called UE, the called S-CSCF will take no corresponding action but further forward the session request message according to those transmitting mechanism already in the prior art.

After the corresponding called UE receives the session request message from the calling UE, it may send a 200 OK message as a response for the session request. After the calling UE receives the 200 OK response, it will send a ACK to the called UE so as to notify the called UE that it has received the final response message for this session request message, which, those skilled in the art can appreciate that, belongs to prior art without need of redundant description herein.

Based thereon, the calling UE establishes a session connection with the called UE.

Descriptions are made to some embodiments of the present invention. It should be appreciated that, the present invention is not limited to the above particular embodiments, those skilled in the art could make various variation or modification within the scope of the appended claims.

What is claimed is:

1. A method of distinguishing a plurality of calling user equipments (UEs) sharing a public user identity (PUID), said method executed by a calling Serving Call Session Control Function (S-CSCF) of an IP Multimedia Subsystem (IMS) network, the method comprising the steps of:
    a. receiving a session request message from a calling UE to establish a session;
    b. determining whether an extension identification feature of said calling UE is enabled;
    c. adding an extension identification, acquired from the Home Subscriber Server (HSS) of the calling UE during a registration process of the calling UE with the calling S-CSCF, that corresponds to said calling UE into said session request message if said extension identification feature is enabled, wherein said extension identification is used to distinguish said plurality of calling UEs and is added into the shared PUID as its part in the session request message; and
    d. sending a session request message updated by said step c to a called UE.

2. The method according to claim 1, further comprising, after said step a, the steps of:
    b1. extracting said PUID of said calling UE from said session request message; and
    b2. determining whether said PUID is a shared PUID;
    wherein said step c further comprises the step of: adding said extension identification that corresponds to said calling UE into said session request message if said PUID is a shared PUID.

3. The method according to claim 1, wherein said extension identification is an address of any data type.

4. The method according to claim 3, wherein said extension identification comprises at least one nonnegative integer.

5. A method of forwarding a session request message from a calling user equipments (UE) to a called UE among a plurality of called UEs sharing a public user identity (PUID), said method executed by a called Serving Call Session Control Function (S-CSCF) of an IP Multimedia Subsystem (IMS) network, the method comprising the following steps:
    i. receiving a session request message from said calling UE to establish a session;
    ii. determining whether said called UE uses a shared PUID according to said session request message;
    iii. determining whether said session request message includes an extension identification, acquired from the Home Subscriber Server (HSS) of the calling UE during a registration process of the calling UE with the called S-CSCF, that corresponds to said called UE if said called UE uses a shared PUID, wherein said extension identification is used to distinguish said plurality of called UEs and is added into the shared PUID as its part in the session request message;
    iv. determining whether an extension identification feature of said called UE is enabled if said session request message includes said extension identification; and
    v. sending said session request message to said called UE according to said extension identification and said shared PUID of said called UE if said session request message comprises said extension identification and said extension identification feature is enabled.

6. The method according to claim 5, further comprising, after said step iii, the steps of:
    v. sending an inquiry message to said calling UE if said session request message does not include said extension identification, wherein said inquiry message is used to determine whether there is a provision of an extension identification that corresponds to said called UE; and
    vi. sending said session request message to said called UE according to said extension identification that corresponds to said called UE provided by said calling UE and said shared PUID of said called UE.

7. The method according to claim 5, wherein said step ii further comprises the steps of:
    ii1. extracting said PUID of said called UE from said session request message; and
    ii2. determining whether said PUID is a shared PUID;
    wherein said step iii further comprises the step of: determining whether said session request message includes an extension identification that corresponds to said called UE if said PUID is a shared PUID.

8. The method according to claim 5, wherein said extension identification is an address of any data type.

9. The method according to claim 8, wherein said extension identification comprises at least one nonnegative integer.

10. A control device implementing a Serving Call Session Control Function (S-CSCF) of an IP Multimedia Subsystem (IMS) network, said control device constructed so as to perform the steps of:
   a. receiving a session request message from a calling UE to establish a session;
   b. determining whether an extension identification feature of said calling UE is enabled;
   c. adding an extension identification, acquired from the Home Subscriber Server (HSS) of the calling UE during a registration process of the calling UE with the calling S-CSCF, that corresponds to said calling UE, into said session request message if said extension identification feature is enabled, wherein said extension identification is used to distinguish said plurality of calling UEs and is added into the shared PUID as its part in the session request message; and
   d. sending a session request message updated by said step c to a called UE.

11. The control device according to claim 10, further constructed to perform, after said step a, the steps of:
   b1. extracting said PUID of said calling UE from said session request message; and
   b2. determining whether said PUID is a shared PUID;
   wherein said step c further comprises the step of: adding said extension identification that corresponds to said calling UE into said session request message if said PUID is a shared PUID.

12. A control device implementing a Serving Call Session Control Function (S-CSCF) of an IP Multimedia Subsystem (IMS) network, said control device constructed so as to perform the steps of:
   i. receiving a session request message from said calling UE to establish a session;
   ii. determining whether said called UE uses a shared PUID according to said session request message;
   iii. determining whether said session request message includes an extension identification, acquired from the Home Subscriber Server (HSS) of the calling UE during a registration process of the calling UE with the called S-CSCF, that corresponds to said called UE if said called UE uses a shared PUID, wherein said extension identification is used to distinguish said plurality of called UEs and is added into the shared PUID as its part in the session request message;
   iv. determining whether an extension identification feature of said called UE is enabled if said session request message includes said extension identification; and
   v. sending said session request message to said called UE according to said extension identification and said shared PUID of said called UE if said session request message comprises said extension identification and said extension identification feature is enabled.

13. The control device according to claim 12, further constructed to perform, after said step iii, the steps of:
   v. sending an inquiry message to said calling UE if said session request message does not include said extension identification, wherein said inquiry message is used to determine whether there is a provision of an extension identification that corresponds to said called UE; and
   vi. sending said session request message to said called UE according to said extension identification that corresponds to said called UE provided by said calling UE and said shared PUID of said called UE.

* * * * *